United States Patent [19]

Yamada

[11] Patent Number: 5,740,999
[45] Date of Patent: Apr. 21, 1998

[54] SEAT SLIDING MECHANISM

[75] Inventor: Yukifumi Yamada, Toyota, Japan

[73] Assignee: Aisin Seiki Kabushiki Kaisha, Japan

[21] Appl. No.: 496,589

[22] Filed: Jun. 29, 1995

[30] Foreign Application Priority Data

Jul. 4, 1994 [JP] Japan .................... 6-173130

[51] Int. Cl.⁶ .................... F16M 13/00
[52] U.S. Cl. .................... 248/429; 248/419; 248/423; 297/341
[58] Field of Search .................... 248/429, 424, 248/425, 423, 416, 419, 430

[56] References Cited

U.S. PATENT DOCUMENTS

| | | | |
|---|---|---|---|
| 4,143,911 | 3/1979 | Sakakibara et al. | 297/341 |
| 4,730,804 | 3/1988 | Higuchi et al. | 248/429 |
| 4,775,126 | 10/1988 | Yokoyama | 248/430 |
| 4,881,774 | 11/1989 | Bradley et al. | 297/341 |
| 4,909,570 | 3/1990 | Matsuhashi | 248/429 |
| 4,927,110 | 5/1990 | Tsumura et al. | 248/430 |
| 5,100,092 | 3/1992 | Sovis | 248/429 |
| 5,192,045 | 3/1993 | Yamada et al. | 248/430 |

FOREIGN PATENT DOCUMENTS

| | | |
|---|---|---|
| 0 135 596 | 4/1985 | European Pat. Off. . |
| 2 268 664 | 11/1975 | France . |
| 2 378 649 | 8/1978 | France . |
| 2 430 330 | 2/1980 | France . |
| 2 233 915 | 1/1973 | Germany . |
| 24 41 186 | 7/1975 | Germany . |
| 2-24691 | 5/1990 | Japan . |
| 5-3389 | 1/1993 | Japan . |

OTHER PUBLICATIONS

French Search Report dated Mar. 26, 1996 (2 pp.).

*Primary Examiner*—Ramon O. Ramirez
*Assistant Examiner*—Anita M. King
*Attorney, Agent, or Firm*—Finnegan, Henderson, Farabow, Garrett & Dunner, L.L.P.

[57] ABSTRACT

The seat sliding mechanism includes locking levers 4, 4 having tabs 6, 6 which are engaged with or disengaged from lock openings 10, 10 formed on lower rails 2, 2, rotatable links 17, 17 pivoted to upper arms 13, 13 slidable relative to the lower rails 2, 2, and sets of connecting links 20, 20 and L-shaped crank links 19, 19 for interconnecting the locking levers 4, 4 and the rotatable links 17, 17. The tilting movement of a seat back causes the rotatable links 17, 17 to be rotated and the rotation thereof to release the tabs 6, 6 from the lock openings so that the front seat can be moved forwardly to the easy entry position.

4 Claims, 8 Drawing Sheets

5,740,999

1

SEAT SLIDING MECHANISM

BACKGROUND OF THE INVENTION

The present invention relates to a seat sliding mechanism which is convenient for use in two-door cars having front and rear seats and provides an adequate opening by folding a seat back of the front seat forwardly and moving the folded front seat in a forward direction for easy entry or walk-in.

A seat sliding mechanism with an easy entry (walk-in) means is well known and the easy entry means generally includes a seat reclining mechanism for adjusting a tilting angle of a seat back frame relative to a seat cushion frame and means for permitting movement of the front seat with its seat back held in the forwardly tilted position to an easy entry position to allow a passenger to get in and out of the rear seat. The conventional seat sliding mechanism with the easy entry means of this type is disclosed for example in Japanese Patent Publication (KOKOKU) No. 24691/1990 and Utility Model Publication (KOKOKU) No. 3389/1993 wherein a manual operation of a reclining lever unlocks the seat reclining mechanism so that the seat back of the front seat can be folded forwardly and subsequently unlatches the front seat sliding means by the forward tilting movement of the seat back so that the upper rails with the front seat can be moved forwardly into the easy entry position. The forwardly folded movement of the seat back in transmitted to locking levers pivoted to the upper rails through wires. Thus, pull movements of the wires due to the forwardly folded movement of the seat back allows the locking levers to be rotated about its pivot pins and tabs thereof to be released from one of series of lock openings formed on the lower rails.

The use of the wires in a conventional mode contributes to large play movements of the wires and a lack of reliability in the easy entry operation. As a result, connecting links are proposed in lieu of the wires to transmit the tilting movement of the seat back to the tabs of the locking levers. However, it is noted that the movements of the tabs of the locking levers for engaging and disengaging the lock openings on the lower rails are traverse to the pull and draw movements of the connecting links to be used so that the change in the direction of movements of the connecting links is necessary and hence each connecting link is complicated in structure.

Further, the conventional easy entry (walk-in) means is not provided with a memorizing mechanism to restore the front seat into a predetermined position. Thus, after the passenger gets in and out of the rear seat, the return position of the front seat is unstable.

SUMMARY OF THE INVENTION

Therefore, it is an object of the present invention to correct the afore-mentioned drawbacks encountered in a prior art.

Another object of the present invention is to provide a seat sliding mechanism having connecting links which are reciprocated in the same plane as a plane in which rotatable links are arranged.

To achieve the objects of the present invention, there is provided a seat sliding mechanism comprising: lower-rails fixed to a vehicle's floor; upper rails slidably secured to the lower rails and supporting a seat cushion and a seat back; a locking lever pivoted to at least one of the upper rails and engaged with or disengaged from the corresponding lower rail; a crank-link of L-shape pivoted to the upper rail and

2 abutting the locking lever; a connecting member connected to the crank-link and reciprocated to transmit a forwardly tilted movement of the seat back to the locking lever; and an abutting point between the locking lever and the crank-link arranged along one linear line relative to a pivoted of the crank-link.

Further, the present invention provides a seat sliding mechanism comprising: lower rails fixed to a vehicle's floor; upper rails slidably secured to the lower rails respectively; a locking lever pivoted to the upper rail and engaged with or disengaged from the lower rail; a memorizing mechanism including a bellcrack link pivoted to the upper rail and abutting the locking lever; and a connecting member connected to the bellcrank link and reciprocated to transmit a forwardly tilted movement of the seat back to the locking lever.

According to the present invention, the rotatable movements of the links are transmitted to the connecting links without play and the L-shaped crank links arranged between the locking levers and the connecting links assist play-free movements of the connecting links. These crank links are also one component of the memorizing mechanism.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
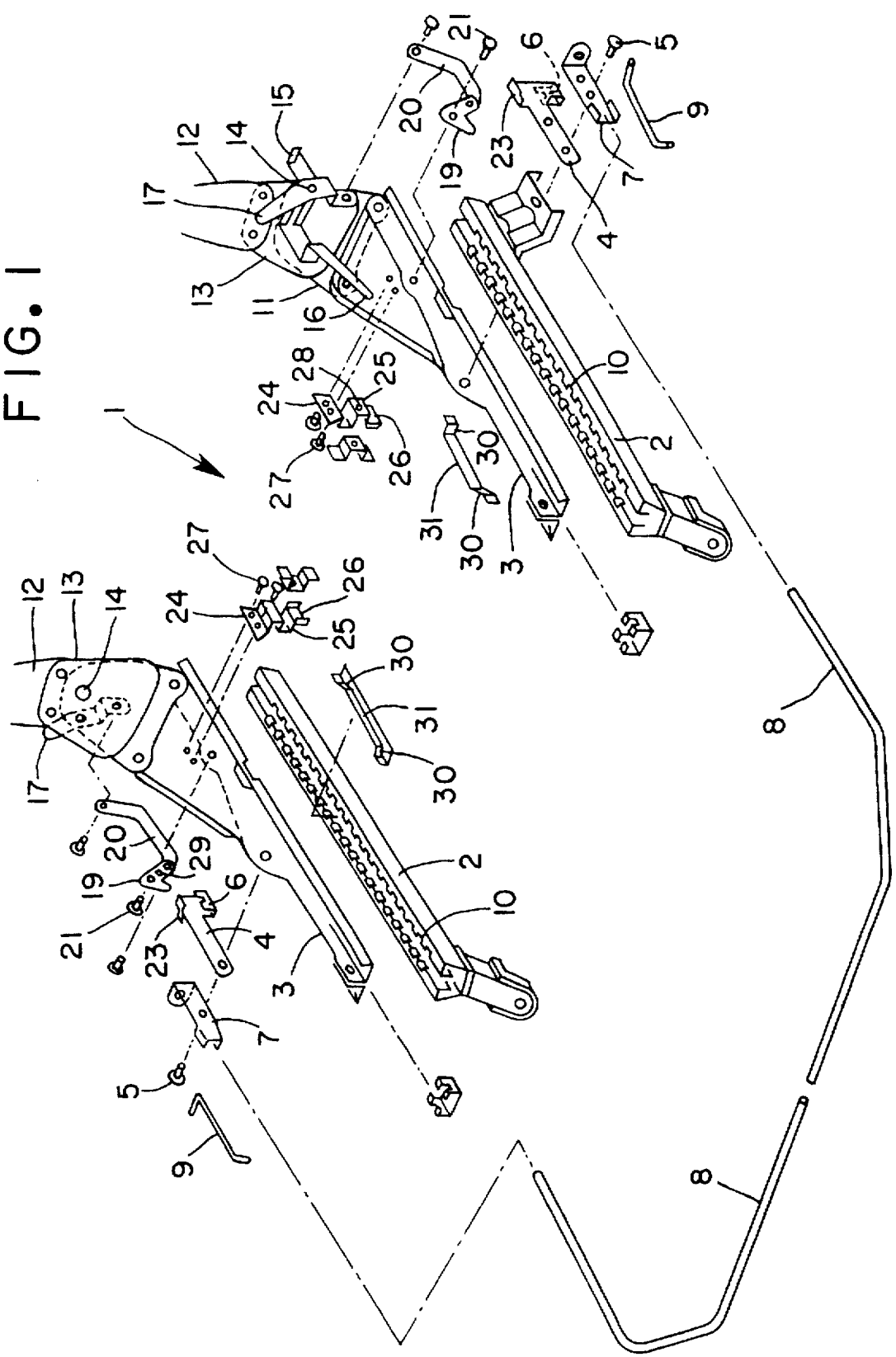
FIG. 1 is an exploded perspective view showing one example of a seat sliding mechanism according to the present invention.

A preferred embodiment of the present invention will now be described with reference to the accompanying drawings.

A seat sliding mechanism 1 includes lower rails 2, 2 fixed to a vehicle's floor (not shown) on both sides of a seat (not shown), upper rails 3, 3 slidable with respect to the lower rails 2, 2 and supporting the seat, and locking levers 4, 4 for locking and unlocking the upper rails 3, 3 with respect to the lower rails 2, 2. The locking levers 4, 4 are pivotally connected to the upper rails 3, 3 by pins 5, 5 and provided at respective ends with tabs 6, 6. Supplementary plates 7, 7 which are operatively associated with the locking levers 4, 4 are coupled to an operating lever 8 for controlling the forward and rearward movements of the upper rails 3, 3. Torsion springs 9, 9 are engaged at respective ends with the supplementary plates 7, 7 and the other respective ends with the upper rails 3, 3 in such a manner that the biasing forces of the torsion springs 9, 9 cause the tabs 6, 6 to be always engaged with one of series of lock openings 10, 10 formed on the lower rails 2, 2.

Figure 2:
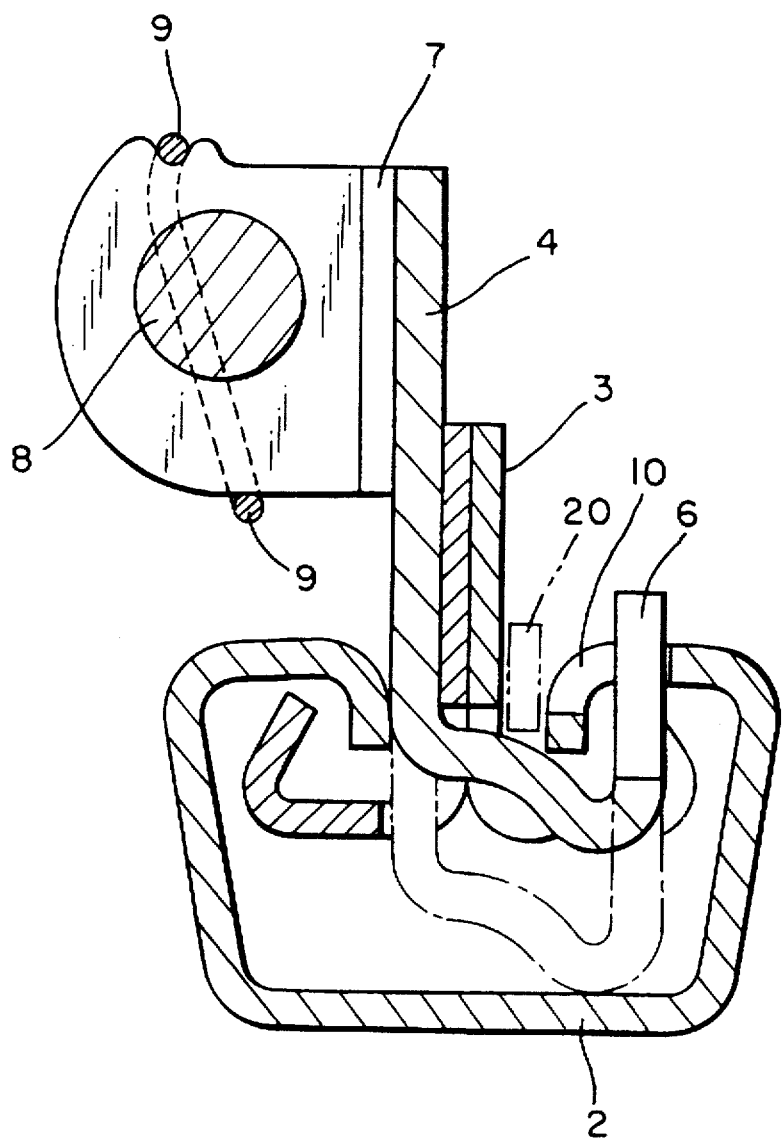
FIG. 2 is a sectional view of an upper rail and a lower rail.

When the operating lever 8 is raised upwardly, the locking levers 4, 4 are forced to be rotated about the pins 5, 5 so that the tab 6 of each locking lever 4 is lowered into a position as indicated in phantom outline in FIG. 2 and disengaged from the lock opening 10. Thus, the upper rails 3, 3 are free to readily slide fore and aft along the lower rails 2, 2. By a release of the operating lever 8, the torsion springs 9, 9 are operative to urge the tabs 6, 6 into engagement with the lock openings 10 corresponding to the desired position for the front seat so that the upper rails 3, 3 are locked on the lower rails 2, 2.

Lower arms 11, 11 fixedly secured to the upper rails 3, 3 and upper arms 13, 13 fixedly secured to a seat back frame 12, 12 are rotatably coupled by traverse shafts 14, 14 of reclining mechanisms (not shown). Manipulating lever 16 having foot pedal 15 is rotatably supported about the shaft 14 at the outboard side of the front seat and also rotatable links 17, 17 are pivoted about the shafts 14, 14. The operation of the foot pedal 15 or the manipulating lever 16 unlocks the reclining mechanism and subsequently the seat back of the front seat can be folded forwardly by assist of a spring (not shown).

Figure 3:
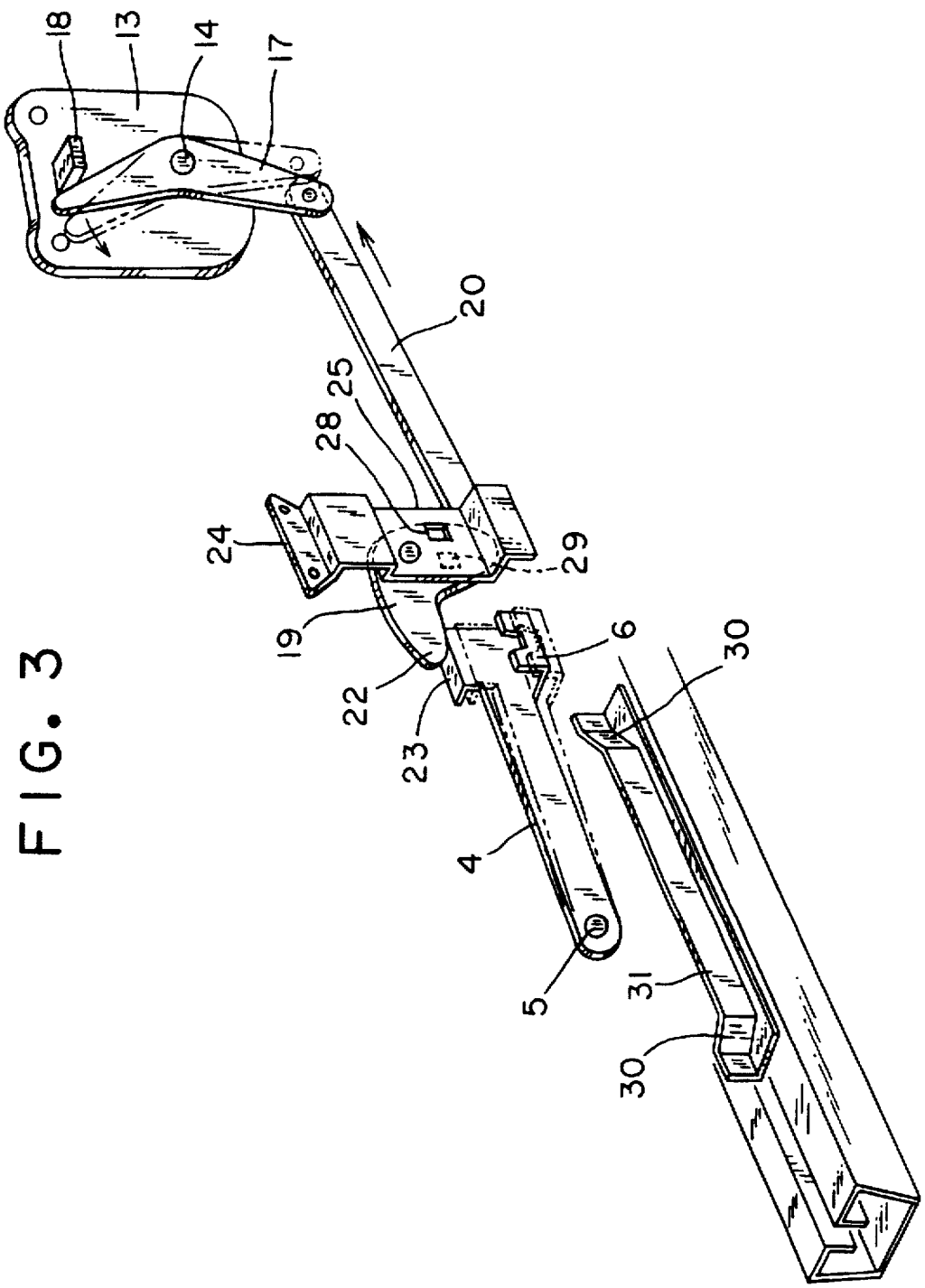
FIG. 3 is a perspective view showing a motion transmitting path from a rotatable link to a locking lever.

By folding the seat back forwardly, latch members 18, 18 secured to the upper arms 13, 13 abut upon the rotatable links 17, 17 to rotate them counter-clockwise in FIG. 3.

L-shaped crank (bellcrank) links 19, 19 are pivotally attached to the upper rails 3, 3 by pins 21, 21 and connected through connecting links 20, 20 with the rotatable links 17, 17. Thus, the rotation of the rotatable links 17, 17 due to the forward tilting movement of the seat back moves the connecting links 20, 20 rightward (in FIG. 3) and the bellcrank links 19, 19 are rotated counter-clockwise about the pins 21, 21. Therefore, abutment portions 22, 22 of the bellcrank links 19, 19 move downwardly (in FIG. 3). Flange portions 23, 23 of the locking levers 4, 4 abut upon the abutment portions 22, 22 so that the locking levers 4, 4 are swung clockwise about pins 5, 5 and the tabs 6, 6 thereof are released from the lock openings 10, 10. The front seat can be moved automatically in a forward direction by a spring (not shown) to provide an opening for easy entry. In other words, the manual operation of the lever 16 or the foot pedal 15 causes the seat back to be tilted forwardly and the forwardly tilting movement of the seat back is transmitted to the locking levers 4, 4 through the latch members 18, 18, the rotatable links 17, 17, the connecting links 20, 20, and the bellcrank links 19, 19 so as to release the engagement of the tabs 6, 6 and the lock openings 10, 10 and slide the front seat in a forward direction.

Figure 4:
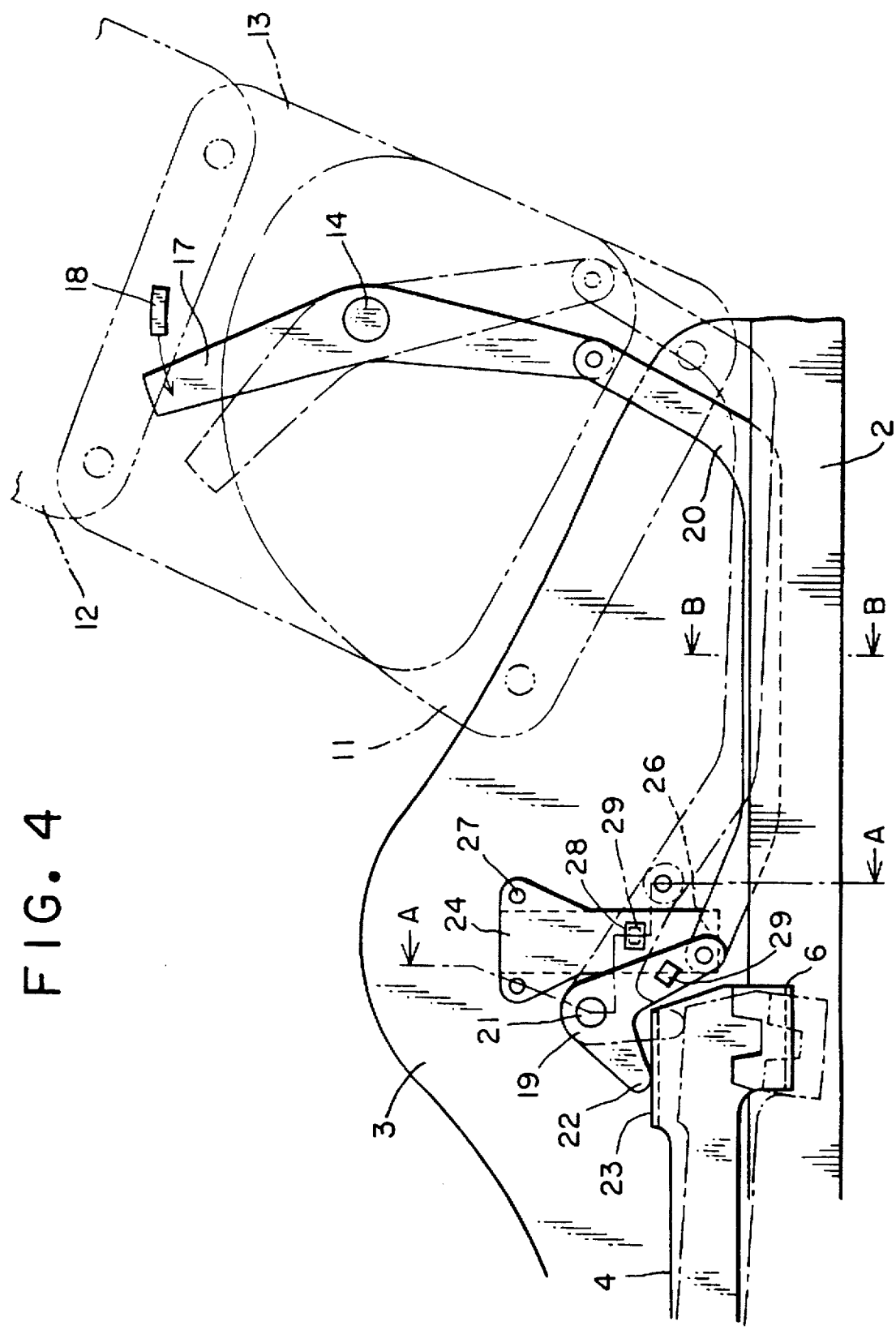
FIG. 4 is an enlarged side view of a part of a rearward portion of an upper rail.
Figure 6:
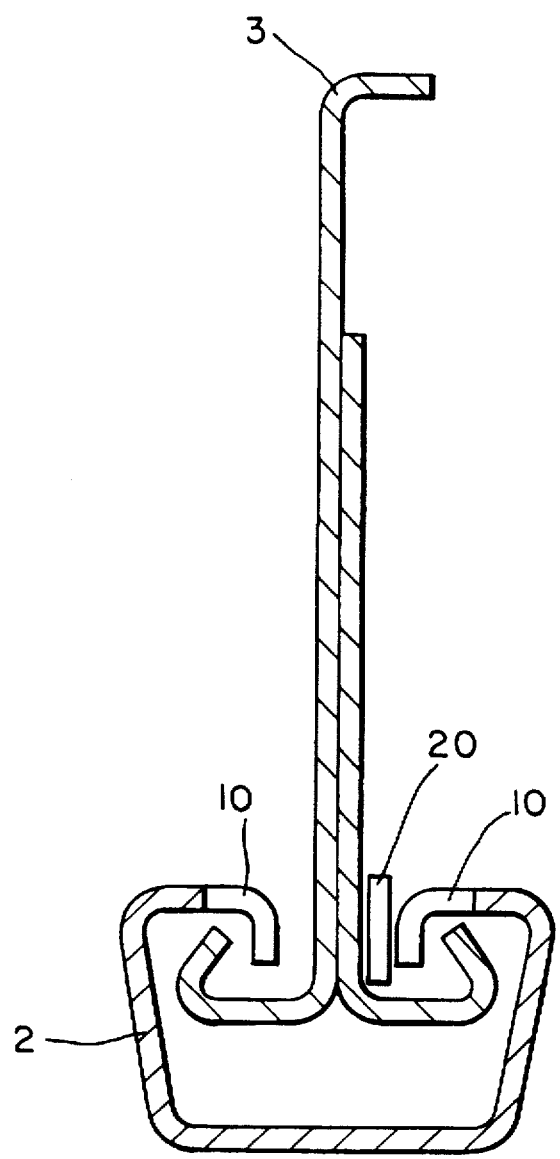
FIG. 6 is a sectional view taken along a line B—B in FIG. 4.

The connecting links 20, 20 are arcuate in outline and center parts thereof are opposed to edges of openings of the lower rails 2, 2 (see FIG. 6). As seen in FIG. 4, face to face relation of the connecting links 20, 20 with the edges of the central openings of the lower rails 2, 2 is maintained even when the front seat is set either in solid line or phantom line in FIG. 4. Unexpected external force exerted on the side surface of the connecting links 20, 20 will be received by the edges of the openings of the lower rails 2, 2 to prevent excess deformation the connecting links 20, 20. This makes it possible to smoothly reciprocate them.

Figure 5:
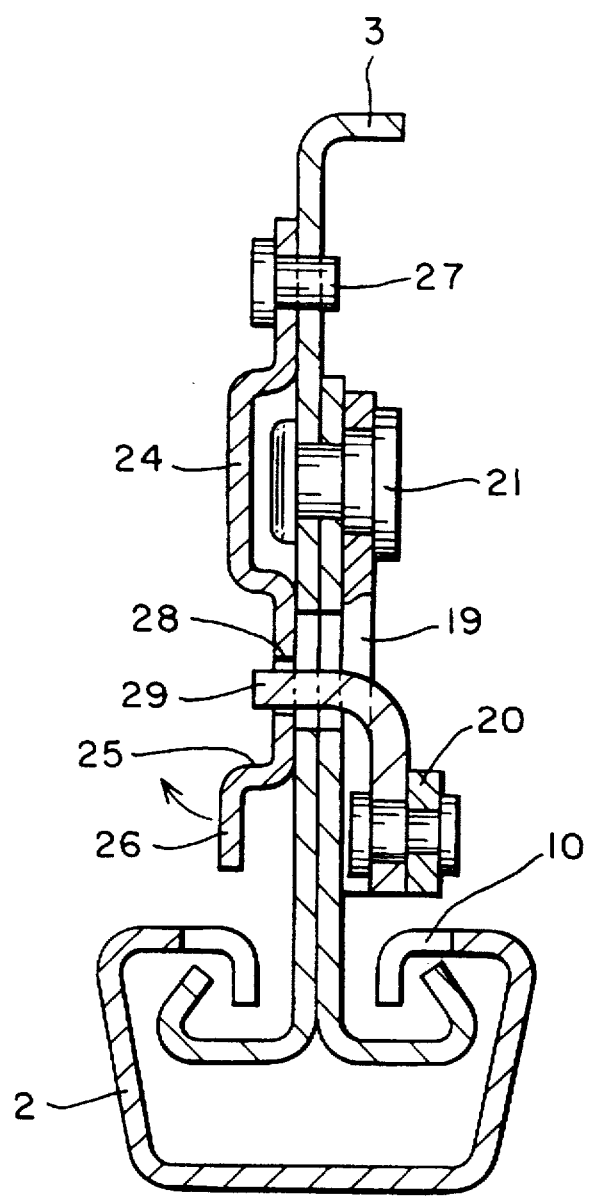
FIG. 5 is a sectional view taken along a line A—A in FIG. 4.

Memorizing mechanisms on both sides of the front seat (not shown) for returning the front seat into a predetermined position will be described hereinafter. Leaf springs 24, 24 are secured on inside surfaces of the upper rails 3, 3 and have inwardly stepped portions 25, 25 to space lower ends 26 of the leaf springs 24, 24 away from the inside surfaces of the upper rails 3, 3, respectively. The leaf springs 24, 24 are deformable about rivets 27, 27 in a direction as indicated by arrow in FIG. 5 and have holes 28, 28, respectively. The bellcrank links 19, 19 have pawls 29, 29 engageable with the holes 28, 28 in response to the rotations of the bellcrank links 19, 19.

Memory returning plates 31, 31 are fixed to rear parts of inside surfaces of the lower rails 2, 2 and have tapered surfaces 30, 30 on both ends thereof. In the course of the front seat being moved forwardly or rearwardly, the plates 31, 31 advance into spaces between the lower ends 26, 26 of the leaf springs 24, 24 and the side surfaces of the upper rails 3, 3 so as to resiliently deform the lower ends 26, 26 in a direction as indicated by the arrow in FIG. 5 and disengage the tabs 29, 29 from the openings 28, 28. The tapered surfaces 30, 30 are helpful in moving the plates 31, 31 into the spaces between the lower ends 26, 26 the leaf springs 24, 24 and the upper rails 3, 3.

When the reclining mechanisms (not shown) are unlocked and the seat back of the front seat is folded forward by the operation of the lever 16 or the foot pedal 15, the latch members 18, 18 have the rotatable links 17, 17 rotated counter-clockwise in FIG. 3 and subsequently the bellcrank links 19, 19 rotated counter-clockwise about the pins 21, 21 in FIG. 3. Movements of the bellcrank links 19, 19 cause the abutment portions 22 to have the locking levers 4, 4 moved downwardly so that the tabs 6, 6 of the looking levers 4, 4 are disengaged from the lock openings 10, 10 of the lower rails 2, 2 and the pawls 29, 29 of the bellcrank link 19, 19 are fitted into the holes 28, 28 of the leaf springs 24, 24. Thus, the bellcrank links 19, 19 and the leaf springs 24, 24 are united as one member.

The forward movement of the front seat causes the plates 31, 31 to resiliently deform the lower ends 26, 26 of the leaf springs 24, 24. However, since the rotatable links 17, 17 are in abutment with the latch members 18, 18, the pawls 29, 29 are brought into disengagement with the holes 28, 28 and again the lower ends 26, 26 of the leaf springs 24, 24 are restored into the initial position so as to engage the pawls 29, 29 with the holes 28, 28 after the forward tapered surfaces 30 passed through the leaf springs 24, 24.

The passenger can get in or out of the rear seat at the time that the folded front seat has taken the forward or easy entry position. After that, the front seat is urged rearward to be returned into its initially predetermined position while raising the seat back thereof. The latch members 18, 18 of the upper arms 13, 13 are released from the rotatable links 17, 17 by the upward movement of the seat back. However, since the pawls 29, 29 are inserted into the holes 28, 28, the bellcrank links 19, 19 are maintained in the position as indicated in phantom outline in FIG. 4 although the rotatable links 17, 17 and the connecting links 20, 20 are likely to be returned into the original position by a biasing force of the spring (not shown). It is noted from FIG. 4 that the axes of the pins 21, 21, the abutment points of the abutment portions 22, 22 of the bellcrank links 19, 19 and the flanges 23, 23 of the locking levers 4, 4, and the center points of the tabs 6, 6 are located along a linear line. This arrangement is helpful in increasing a resistance against the upward movement of the flanges 23, 23 of the locking levers 4, 4 when the operating lever 8 is unintentionally lowered or pushed down.

The rearward movement of the front seat causes the memory returning plates 31, 31 to resiliently deform the lower ends 26, 26 of the leaf springs 24, 24 and disengage the pawls 29, 29 from the holes 28, 28. As a result, the bellcrank links 19, 19 are returned into the position as indicated in solid outline in FIG. 4 and the tabs 6, 6 of the locking levers 4, 4 are engaged with the lock openings 10, 10. Thus, the upper rails 3, 3 are locked on the lower rails 2, 2.

Figure 7:
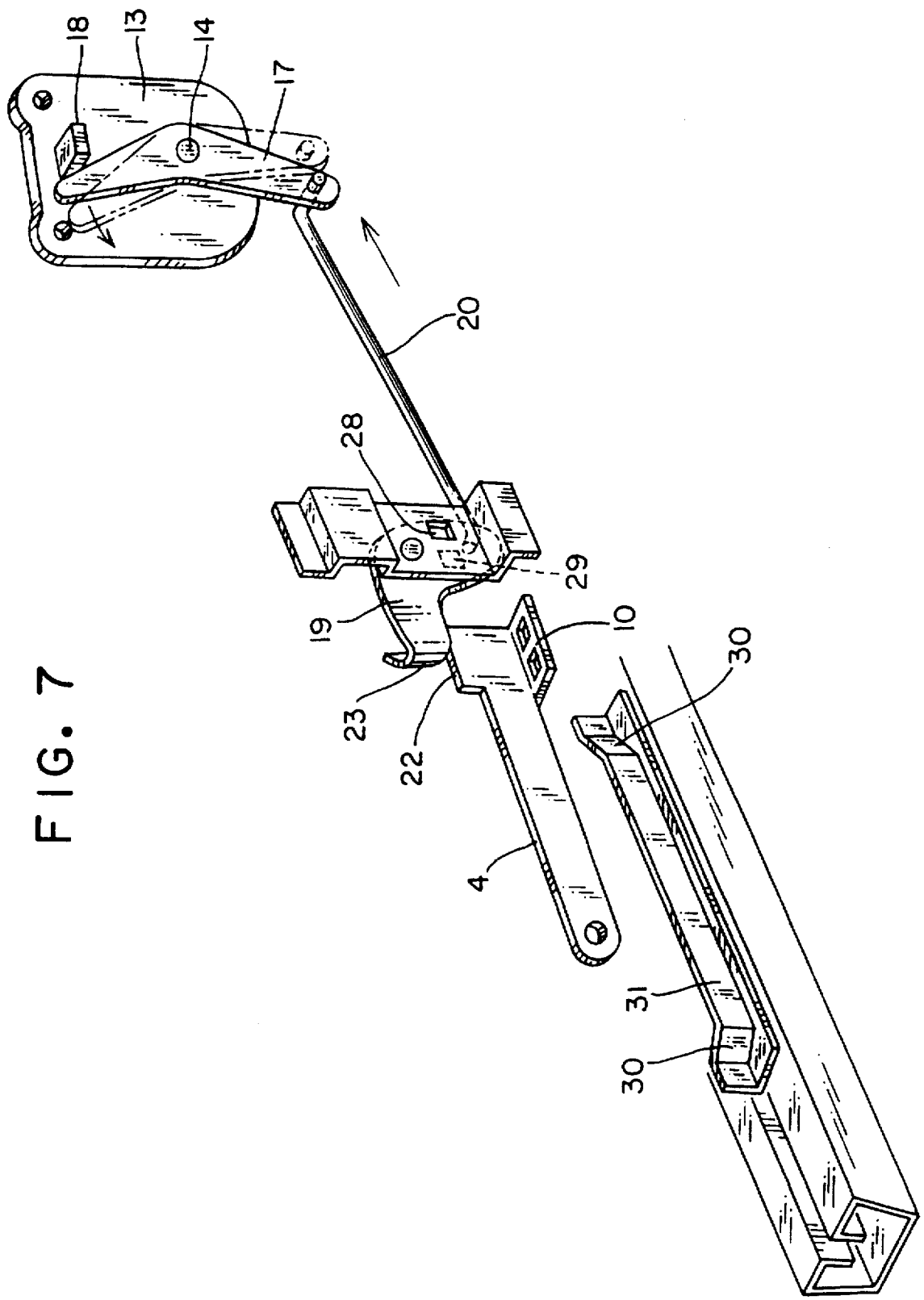
FIG. 7 is a side view of another embodiment of the present invention.

FIG. 7 shows another embodiment of the memorizing mechanism in which the connecting link 20 is composed of a rod and the bellcrank 19 is provided at its one end with a flange 23. The flange 23 of the bellcrank 19 is brought into contact with an abuttment portion 22 formed on the locking lever 4. In this case, the connecting link 20 is pulled rightward as indicated by an arrow. The bellcrank link 19 is rotated counterclockwise so that the flange 23 thereof pushes the abuttment portion 22 downward.

Figure 8:
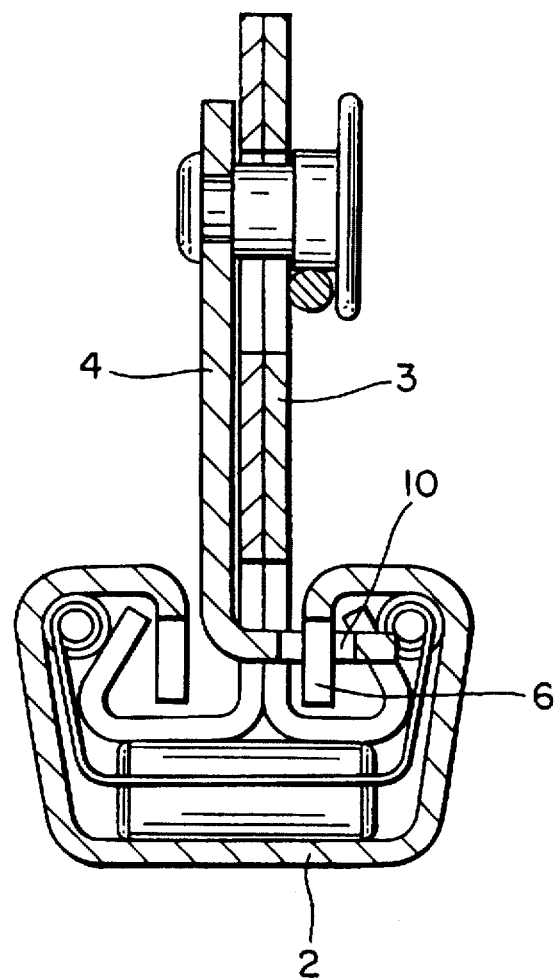
FIG. 8 is a cross-sectional view of the other embodiment of a rail assembly used in the present invention.

FIG. 8 shows the other embodiment of a rail assembly in which the lower rail 2 has a lock tab 6 and the locking lever 4 is provided with at least one locking opening 10 engageable with the locking tab 6 when the locking lever 4 is pressed downward by the counterclockwise direction of the bellcrank 19.

It should be noted that the connecting link 20, the bellcrank link 19 and the memorizing mechanism are arranged only along one side of the seat. In this case, the manipulating lever is in rigid relation with a pair of the locking lever 4.

As many apparently widely different embodiments of the present invention can be made without departing from the spirit and scope thereof, it is to be understood that the invention is not limited to the specific embodiments thereof except as defined in the appended claims.

What is claimed is:

1. A seat sliding mechanism comprising:

a lower rail attachable to a vehicle floor;

an upper rail slidably secured to the lower rail for supporting a seat cushion and seat back;

a locking lever pivotally connected to the upper rail and engageable with and disengageable from the lower rail;

a generally L-shaped crank-link pivotably attached to the upper rail and abutting the locking lever;

a connecting member connected to the crank-link and reciprocated to transmit a forwardly tilted movement of the seat back to the locking lever; and an abutting point between the locking lever and the crank-link arranged along one linear line relative to a pivoted point of the crank-link, the locking lever and the crank-link being provided within a space defined by a cross section of the lower rail.

2. A seat sliding mechanism according to claim 1, in which at least parts of side surfaces of the connecting member are opposed to edges of a central opening of the lower rail.

3. A seat sliding mechanism comprising:

a lower rail attachable to a vehicle floor;

an upper rail slidably secured to the lower rail for supporting a seat cushion and seat back;

a locking lever pivoted to the upper rail and engageable with and disengageable from the lower rail;

a memorizing mechanism including a bellcrank link pivotably attached to the upper rail and abutting the locking lever, a leaf spring affixed to the upper rail and opposed to a portion of the bellcrank link so as to engage the bellcrank link and a memory restoring plate fixed to the lower rail resiliently deforming the leaf spring so as to release the engagement of the leaf spring from the bellcrank link, the engagement occurring in a direction of a width of the lower rail in response to rotation of the bellcrank link; and a connecting member connected to the bellcrank link and reciprocated to transmit a forwardly tilted movement of the seat back to the locking lever.

4. A seat sliding mechanism according to claim 3, wherein the leaf spring, includes an inwardly-stepped portion and an aperture defined thereon engageable with a pawl of the bellcrank link.

* * * * *